(12) United States Patent
Armitage et al.

(10) Patent No.: US 6,735,162 B2
(45) Date of Patent: May 11, 2004

(54) APPARATUS AND METHOD PROVIDING A MIRROR AVERAGING FUNCTION TO GENERATE A MIRROR SIGNAL FROM OPTICAL DATA ON AN OPTICAL DISC

(75) Inventors: Philip J. Armitage, Oldham (GB); David I. Boddy, Rawtenstall (GB)

(73) Assignee: LSI Logic Corporation, Milpitas, CA (US)

( * ) Notice: Subject to any disclaimer, the term of this patent is extended or adjusted under 35 U.S.C. 154(b) by 504 days.

(21) Appl. No.: 09/880,283

(22) Filed: Jun. 13, 2001

(65) Prior Publication Data
US 2002/0093904 A1 Jul. 18, 2002

(30) Foreign Application Priority Data

Nov. 29, 2000 (GB) .............................................. 0029121

(51) Int. Cl.[7] .............................................. G11B 7/002
(52) U.S. Cl. .......................... 369/124.11; 369/124.015; 369/53.015
(58) Field of Search ....................... 369/124.01, 124.02, 369/124.04, 124.1–124.15, 44.35, 44.36, 59.17, 30.13, 53.15

(56) References Cited

U.S. PATENT DOCUMENTS

| 4,499,570 A | * | 2/1985 | Schouhamer Immink et al. ............................................. 369/47.18 |
| 5,081,653 A | * | 1/1992 | Saito .......................... 375/345 |
| 5,715,217 A | * | 2/1998 | Fuji ......................... 369/44.26 |
| 5,841,751 A | * | 11/1998 | Komazaki et al. ........ 369/53.33 |
| 5,953,305 A | * | 9/1999 | Jeong .......................... 327/552 |
| 6,081,485 A | * | 6/2000 | Minase et al. ........... 369/53.37 |

* cited by examiner

Primary Examiner—W. R. Young
Assistant Examiner—Michael Battaglia
(74) Attorney, Agent, or Firm—Christopher P. Maiorana, P.C.

(57) ABSTRACT

In the context of mirror modulation (56, 90, 104) extraction during track seek or jump modes of an optical disc reading device (12), such as a DVD ROM, a mirror averaged level (i.e. the dc level (52) of the RF envelope (34)) is held so that the mirror modulation (90) is seen as a swing below a set mirror rebias level (86) at an output of a mirror amplifier (72), as shown in FIG. 3. With the holding of the dc level (52) by a ground-referred capacitor (302) during seek operation of the device (12), a first input ($n_{in}$) to the mirror amplifier varies with the mirror modulation, whereas a second input ($p_{in}$) to the mirror amplifier (72) does not vary. This phenomenon enables the top level of a RFRP signal (82) to be defined by the mirror rebias level (86) and the mirror component swing (during seek operation) to be optimized and always to occur below the mirror rebias level (86). During on-track operation, the first input ($n_{in}$) and the second input ($p_{in}$) are essentially equal and so the RFRP signal (82) sits at the dc level (52). Being able both to define the mirror rebias level (86) and to vary a gain (84) of the mirror amplifier (72) allows a swing, arising from the mirror modulation, in the RFRP signal (82) to be optimally positioned in relation to top and bottom hold circuits (96, 98) used for definition of a slice level (94) for mirror recovery purposes.

17 Claims, 3 Drawing Sheets

APPARATUS AND METHOD PROVIDING A MIRROR AVERAGING FUNCTION TO GENERATE A MIRROR SIGNAL FROM OPTICAL DATA ON AN OPTICAL DISC

This application claims the benefit of United Kingdom Application No. 0029121.1 filed Nov. 29, 2000.

FIELD TO THE INVENTION

This invention relates, in general, to a mechanism and apparatus for coherently recovering and interpreting data from an optical disc, such as encoded on a digital versatile disc read only memory (DVD-ROM) or the like. More particularly, but not exclusively, the present invention provides an apparatus and method that supports a mirror averaging function to generate, in the context of data recovery and through the implementation of a ground referred capacitor, a mirror signal from optical data on an optical disc.

BACKGROUND OF THE INVENTION

With respect to the storage of data on optical storage media, such as on compact disc read only memory (CD-ROM) and DVD-RAM, a selected form of modulation encodes data into the surface of the media. In the context of DVD-ROM or DVD-RAM, an eight-fourteen modulation (EFM) scheme is used to encode binary data through data "pits" that are either magnetically or optically inscribed within, or manually embossed/stamped on, the surface of the optical storage medium and undisturbed mirror regions. The length of the pit or complementary mirror is indicative of the encoded binary information, subject to there being no defects associated with the formation of the pit or mirror.

The data segments (or sectors) spiral outward from a center of the optical storage medium. The data segments are also indexed through a header that is embossed (e.g., physically stamped) onto the surface of the optical storage medium. The header providing address and location information, such as track and sector numbers. The headers are individually indexed at the beginning of the disc for scanning. The headers have a precisely defined width dimension and are separated by a data sector of defined length.

From a perspective of data recovery, once on-track, an array of (typically) four photodiodes recovers the information stored on the medium. The four photodiodes provide an output current that varies according to an amount of reflectivity from the surface of the medium. More particularly, laser light is reflected from the marks and spaces, with a data pit (i.e., a mark) providing an inferior reflectivity and hence a lower current than a space that provides maximum reflectivity and hence maximum current. Essentially, with respect to data pits, destructive interference at the photodiode is generally indicative of EFM modulation. The array is conventionally in the form of a 4-quadrant photodiode array in which a sum of the individual currents from the photodiodes is used to extract EFM data. Specifically, the four currents from the photodiode are converted to voltages in a pre-amplifier of a pick-up assembly before being presented to a read channel. The variation in the reflected laser light levels results in voltage signals of varying magnitude and duration, (i.e., read frequency) the data, which are processed by the read channel to produce raw binary data.

When reading data from CD and DVD ROM discs, it is necessary to detect regions of the disc that contain defects. The regions take two forms (i) areas where the reflectivity of the disc is greatly reduced (i.e., defects) and (ii) areas where the data region is at maximum reflectivity (i.e., interrupts). Detection of the regions is necessary in order to perform certain holding and corrective functions in the player/recorder to maintain the data channel (principally the read channel) in a stable state during such defective regions. For example, at detection of a defect, the phase lock loop and/or the tracking servo can be frozen. Failure to detect a defect otherwise results in the loss of coherent data in that particular region of defect, thus requiring a full recovery. Once the device is on-track, the device should be held on-track to avoid having to instigate a full recovery action for coherent data recovery.

Furthermore, the ability to resolve mirror (i.e., high reflectivity) regions is important in the context of device operation since mirror regions inherently exist between adjacent tracks of an optical disc. Consequently, monitoring of the photodiode output during a track seek or jump mode where a read/write head (or pick-up assembly) moves radially across multiple contiguous tracks results in a sinusoidal modulation of the envelope of the read frequency data (mirror signal or mirror modulation). Such mirror modulation is used to extract a mirror component to control radial servo movement since the sinusoidal oscillation can be used to determine radial distance and relative movement between tracks by counting periods in the mirror signal. In contrast with read frequency on-track data (which has a frequency of several megahertz), mirror modulation during track transition has a relatively low frequency of about 100 kilohertz.

In terms of the mirror modulation, while the oscillation (i.e., the variation or perturbation) of the read frequency envelope edge is referred to as being "sinusoidal", it will be understood that the mirror modulation may take other forms and is generally more triangular in its nature. Consequently, the term "sinusoidal" should not be considered as limiting but merely descriptive of how mirror modulation affects the read frequency envelope 34.

In summary, the mirror modulation is extracted from the composite read frequency (RE) signal to produce what is commonly referred to as the read frequency reference pointer (RFRP) signal. The RFRP signal has to be appropriately biased and its voltage swing optimized such that the RFRP signal can be sliced effectively to generate the mirror signal during a track seek operation. The RFRP signal may be used to be positioned in a range of an associated digital-to-analog converter (DAC) that processes the RFRP signal for servo control. To date, rebiasing and repositioning have been accomplished in read channel schemes by coupling the composite read frequency signal externally to the integrated circuit (IC) into the mirror amplifier. Such a configuration requires two pins and a coupling capacitor. Unfortunately, the mechanism of coupling is considered sub-optimum, since AC coupling produces a high pass filter characteristic in the circuit. Moreover, the high pass filter characteristic causes level variations in the upper and lower thresholds of the mirror modulation of the RFRP signal during seek. Indeed, the level variations significantly complicate the extraction (and slicing) of the mirror. If AC coupling is adopted in the context of a mirror recovery circuit, the AC coupling results in drift in the mirror frequency that is caused by an RC time constant of the effective high pass filter. Consequently, there is a requirement to constantly adjust top and bottom hold circuits to maintain a correct slice level for accurate mirror detection and track identification purposes.

Methods for detecting low reflectivity defect regions are well documented and readily available in CD and DVD read channel integrated circuits. It will be understood that defects, in general, have an affect of corrupting a mirror modulation signal, with the defect causing de-focusing of the laser at the photodiode to a dark level, whereas interrupts generate spurious mirror signals. The defect takes the recovered signal components below a read frequency envelope/ threshold associated with a data pit.

SUMMARY OF THE INVENTION

According to a first aspect of the present invention there is provided a mirror circuit for an optical disc media device, the mirror circuit comprising an amplifier. The amplifier comprises a first input, a second input and an output. The amplifier may be arranged to receive an averaged DC level of a read frequency envelope derived from modulated data on an optical disc. The first input may be coupled to a first potential divider network that is further responsive to a biasing signal having a rebias level. The second input may be responsive to a signal having a mirror modulation component and a data component substantially corresponding to the averaged DC level. The output may provide an amplified signal output. The output may be coupled to the second input through a feedback path. The feedback path may form part of a second potential divider network matched to the first potential divider network. The biasing signal may cause a level swing induced by the mirror modulation component in the amplified output signal to be below the rebias level. The rebias level may appear as the amplified output signal when the data component is present in the signal applied to the second input.

Typically, the first potential divider network includes a first resistor coupled to the first input and a first variable resistor coupled to the first input and further coupled in parallel with the first resistor. The first variable resistor may be arranged to receive the biasing signal. The second potential divider network generally includes a second resistor coupled to the second input and a second variable resistor within the feedback path and coupled to the second input.

An averaging circuit may also be provided. The averaging circuit may be coupled to the first input. The averaging circuit may preferably contains an in-line resistor coupled to receive the signal and a ground-referred capacitor coupled to ground between the in-line resistor and the first input. Alternatively, a digital averaging circuit is coupled to receive the signal and arranged to provide the averaged DC level to the first input.

In a second aspect of the present invention there is provided a method of biasing an extracted mirror component from an optical disc, the extracted mirror component used for slicing to generate a mirror signal, the method comprising: (A) applying to a first input of a differential amplifier an averaged DC level of a read frequency envelope derived from modulated data on the optical disc; (B) applying to a second input of the differential amplifier a signal having a mirror modulation component and a data component substantially corresponding to the averaged DC level; and (C) applying a biasing signal having a rebias level to the first input. The biasing signal may cause a level swing induced by the mirror modulation component in an amplified output signal to be below the rebias level and further to cause the rebias level to appear as the amplified output signal when the data component is present in the signal applied to the second input.

The averaged DC level is preferably generated through one of: holding the DC component of the signal on a ground-referred capacitor electrically isolated from the first input; and generating a digital voltage representation of the averaged DC level. The method may further comprise: applying the averaged DC level to the first input through a first potential divider network responsive to the biasing signal; and providing a feedback path for the amplified output signal to the second input. The feedback path forms part of a second potential divider network matched to the first potential divider network.

In a further aspect of the present invention there is provided a method of biasing an extracted mirror component from an optical disc supporting data in a signal envelope, the extracted mirror component derivable from mirror modulation of the signal envelope, the method comprising: (A) filtering the signal envelope to generate, over time, a first signal having: (i) a DC offset component representative of the data and (ii) mirror modulation providing variations in level from the DC offset component; and (B) rebiasing the first signal to produce an intermediate signal in which level swings attributable to the mirror modulation are below a reference level associated with the DC offset component.

The rebiasing may include applying a biasing signal having a rebias level to a non-inverting input of a differential amplifier. The biasing signal may cause the level swings in an amplified output signal to be below the rebias level and may further cause the rebias level to appear as the amplified output signal when data is present in the signal applied to an inverting input of the differential amplifier. In one example, the method may further comprise slicing the intermediate signal to generate pulses of a mirror signal.

A particular embodiment further comprises generating a high passed version of the first signal as the amplified output signal, the high passed version generated in a feedback path to the inverting input. The feedback path may have a variable gain and the method may further include maintaining correspondence between the gain in the feedback path and a gain associated with the biasing signal.

The ground referred capacitor scheme of the preferred embodiment is used in the mirror averager circuit to derive the on-track level for the composite read (SUMDC_INT) signal. By holding the composite read signal during seek and track jump modes of operation, an upper limit of the RFRP signal can be maintained at a predetermined level. One embodiment of the present invention advantageously provides a robust mirror recovery mechanism that is less likely to suffer from inaccurate mirror frequency determination, since the mirror modulation is relatively stable and the RFRP signal is dynamically rebiased to optimize slicing.

Exemplary implementations of the present invention allow the analog RFRP signal (containing a representation of the mirror) to be reliably sliced to generate a square wave mirror signal. The mirror may be generated by defining a suitable slice threshold (using peak and trough hold functions) between peak-to-peak variations in the RFRP signal. The RFRP signal is positioned where the top and bottom hold can operate with maximum resolution.

BRIEF DESCRIPTION OF THE DRAWINGS

These and other objects, features and advantages of the present invention will be apparent from the following detailed description and the appended claims and drawings in which:

DETAILED DESCRIPTION OF A PREFERRED EMBODIMENTS

Figure 1:
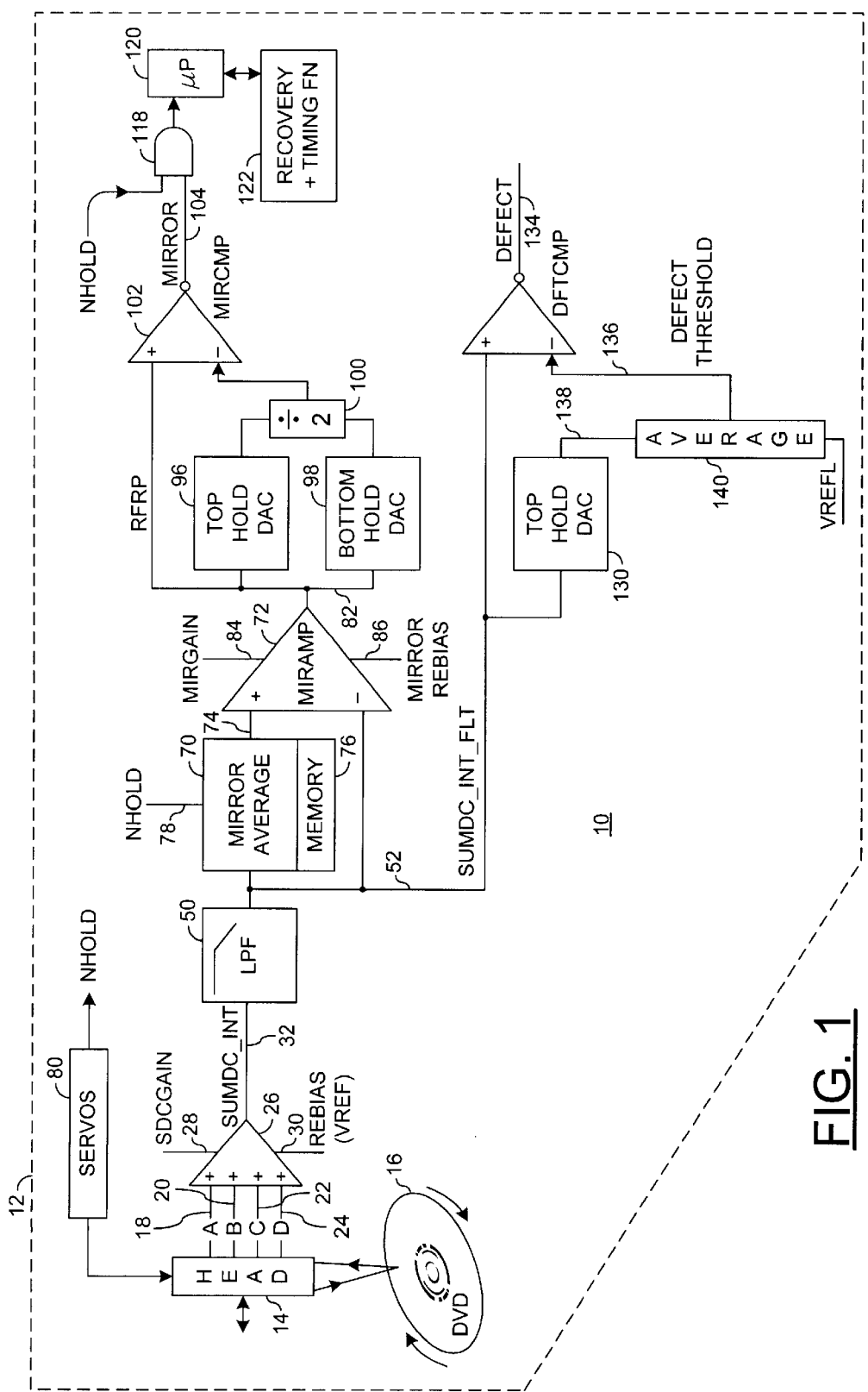
FIG. 1 is a schematic block diagram of a mirror detection circuit shown in situ within an optical disc device.

Referring to FIG. 1, a schematic block diagram of a mirror detection circuit 10 is shown. The circuit 10 may incorporate mirror averaging and mirror amplifier functions of the preferred embodiment of the present invention. The circuit 10 is shown within an optical disc device 12, such as a DVD-player or CD read-write machine. The circuit 10 is principally used to extract the mirror. However, complementary functions support both defect and interrupt detection.

Assuming the optical disc device to contain a head assembly 14 supporting a four-quadrant photodiode array for recovering optically modulated data from an optical disc 16, four resultant photodiode voltages 18–24 are applied to an amplifier 26 operationally responsive to a gain control signal (e.g., SDCGAIN) 28 set relative to a rebiased dark level (e.g., VREFL) reference signal 30 indicative of a voltage associated with a dark level region generally containing unrecoverable data in a defect region. A composite (e.g., summed) output voltage (e.g., SUMDC_INT) 32 from the amplifier 26 has a general bounded characteristic that produces a read frequency envelope 34 displaced above (e.g., biased to) the VREFL (dark) level 30. When no light shines on the photodiodes, SUMDC_INT will sit at the dark level of VREFL 30. The read frequency envelope 34 can be best seen in relation to FIG. 2a, in which variations in voltage amplitude are indicative of recovery of optically stored data, such as EFM data on a DVD.

Figure 2:
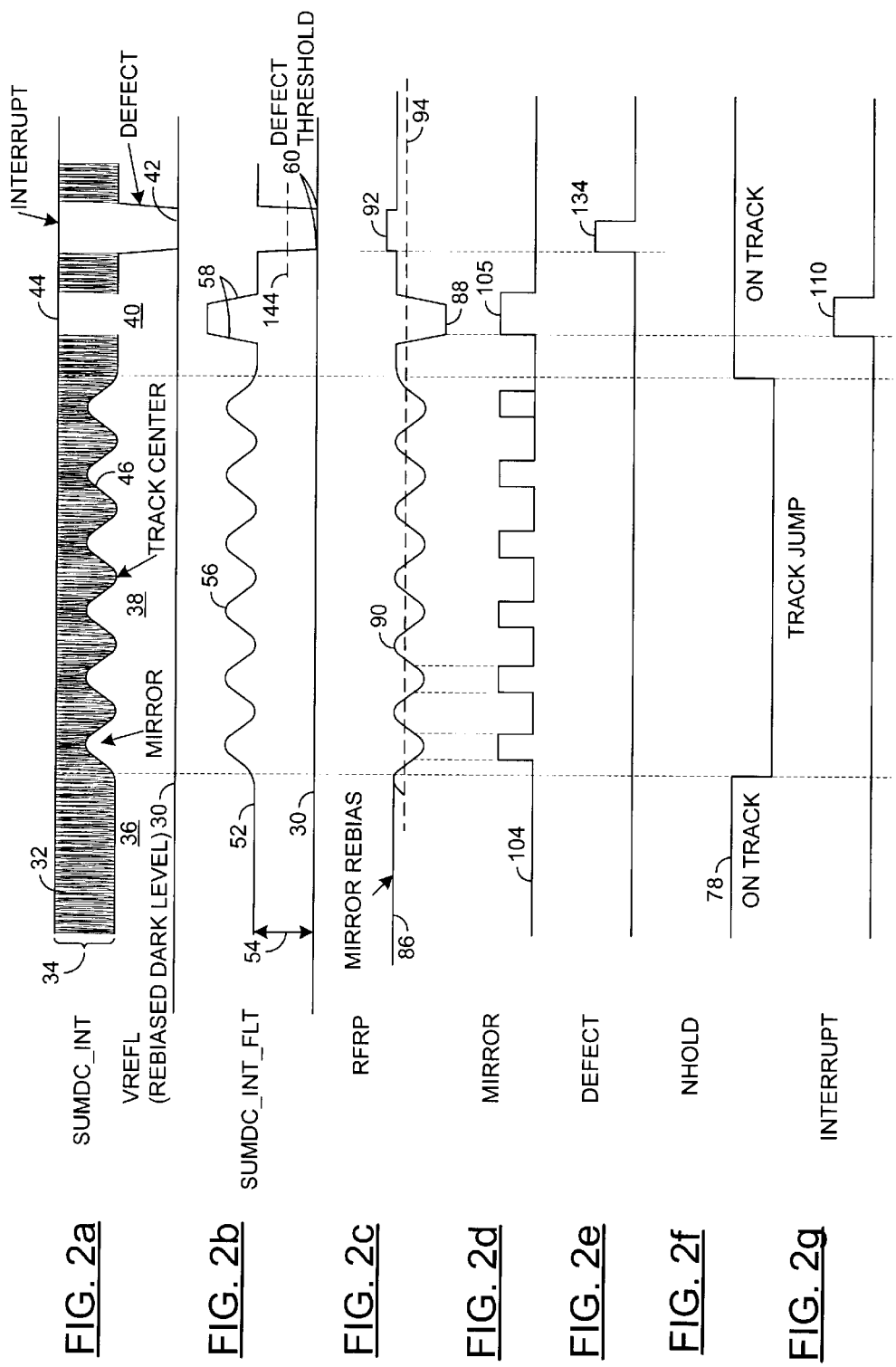
FIG. 2 is an annotated diagram illustrating interrelationships between various signals produced during operation of the circuit of FIG. 1.

Referring to FIG. 2a in slightly more detail, the signal profile of the read frequency envelope 34 of the SUMDC_INT signal 32 is shown in three particular states, namely: (i) an on-track state 36 in which there is recoverable data; (ii) a track scanning state 38; and (iii) an on-track state 40 in which defects 42 and interrupts 44 are present. During track transition (e.g., radial movement of the head assembly 14 across the optical disc 16) a lower edge of the read frequency envelope 34 is modulated by the mirror regions between tracks resulting in a sinusoidal edge 46 to the read frequency envelope. The sinusoidal edge is the mirror signal. It should be noted that the sinusoidal edge 46 modulates a level of reflectivity relative to a maximum voltage associated with a mirror region, and that the mirror modulation only appears on a lower edge of the read frequency envelope 34. During periods of interrupt 44, the SUMDC_NT signal 34 is entirely lost and the maximum reflectivity determined by the head arrangement causes a maximum voltage output for the duration of the interrupt 44. Conversely, during periods of defect 42, the voltage output of the SUMDC_INT signal 34 reverts to the dark level of VREFL 30 and the read frequency envelope is lost for the duration of the defect. Minima in the sinusoidal edge 46 of the read frequency envelope 34 correspond to the center of off track mirror regions, and maxima in the sinusoidal edge 46 correspond to the center of each track while track jumping. Some variable gain in the amplifier 26 allows a reasonable swing to be set. It should be appreciated that mirror modulation can approach about 90% of the read frequency envelope 34.

Returning to FIG. 1, the SUMDC_INT signal is applied to a low pass filter (LPF) 50 to remove the read frequency envelope 34 but to retain relatively low frequency variations within the read frequency envelope 34. Low pass filtering produces a filtered signal (e.g., SUMDC_INT_FLT) 52 having a DC offset 54 with respect to VREFL 30 for the EFM on-track data, the mirror signal 56 and definitive positive 58 and negative 60 voltage level transitions for respective interrupt 44 and defect 42 regions. The signal profile of the filtered signal (SUMDC_INT_FLT) 52 can be appreciated with reference to FIG. 2b. The filtered signal (SUMDC_INT_FLT) 52 provides a DC level of the read frequency signal 32 about which DC level the mirror oscillates. As will be understood, residual read frequency may appear on the filtered signal 52, although dependent upon the setting of the cut-off of the low pass filter 50. The amplitude of the oscillating mirror signal is adjusted by setting of the gain control signal (SDCGAIN) 28, with the gain selected to provide a peak-to-trough variation that is discernible from the DC offset 54 and the transitions associated with interrupts 44 and defects 42.

Following low pass filtering, the filtered signal (SUMDC_INT_FLT) 52 is preferably applied to two distinct circuit paths, namely a first path associated with mirror extraction and a second path dedicated to defect detection. As regards the mirror path, the filtered signal (SUMDC_INT_FLT) 52 is applied both to a mirror averaging circuit 70 and directly to an inverting input of a mirror amplifier 72. A non-inverting input of the mirror amplifier 72 receives a mirror averaged signal 74 from the mirror average circuit 70. The mirror averaging circuit 70 operates to attain an average DC level for the read frequency envelope 34 during on-track data recovery and further operates to hold (such as in local memory 76 associated with the servo ADC or by way of charge on a capacitor) the average DC level during periods of track seeking or track jumping.

The mirror averaging circuit is operationally responsive to a system flag (e.g., NHOLD) 78 that is set to be indicative of whether the optical device is on-track jump/seek or on-track mode. Essentially, the NHOLD 78 reflects operation of servos 80 associated with the control of the head assembly 14 and reflects, for example, the duration of a track seek operation.

The mirror amplifier 72 during an on-track operation, an output signal from the mirror amplifier (RFRP) 82 is an inverted version of the filtered signal (SUMDC_INT_FLT) 52. The mirror amplifier 72 preferably has a dynamically programmable gain (e.g., MIRGAIN) 84, with the mirror amplifier 72 operating relative to a DC mirror rebias level 86 that is crafted to sit near a maximum ADC range associated with servo control. The DC mirror rebias level 86 may be varied to alter the RFRP signal 82 and hence to optimize system performance having regard to variation in the read frequency envelope 34. The ADC range therefore defines the rebiased dark level (VREFL) reference signal 30 and the DC mirror rebias level 86 to provide an optimum operating range and such that the RFRP (read frequency reference pointer) signal 82 lies within the range of the read frequency envelope 34. Consequently, during on-track operation, the RFRP signal 82 substantially sits at the mirror rebias level 86 and, through signal inversion, the mirror signal swings below the mirror rebias level 86; as seen in FIG. 2c. The amplitude of the RFRP signal 82 is set by the mirror gain and the gain control signal (SDCGAIN) 28.

During an interrupt, the signal inversion experience by the RFRP signal 82 causes a voltage representative of the interrupt 44 to deflect to a level 88 significantly below the level experiences in the sinusoidal mirror signal oscillation 90. Conversely, each defect results in the RFRP signal 82 peaking at a maximum level 92 above an upper threshold (e.g., the mirror rebias level during on-track mode) of the sinusoidal mirror signal oscillation 90.

When on-track with inputs to the mirror averaging circuit 72 being effectively equal, the RFRP signal 82 sits at the DC mirror rebias level 86. However, during track seek or jump, the level of the mirror averaging circuit is held such that the mirror modulation is seen as a swing below the mirror rebias level 86. The DC level of the SUMDC_INT_FLT signal 52 is held by the mirror averaging circuit 70 during seek and jump modes of operation, while the mirror signal 56 is positioned at an optimum position (with respect to the mirror rebias level 86 of the RFRP signal) for top hold. Amplification provides optimum positioning of the mirror signal with respect to bottom hold requirements.

Also shown in relation to the waveform of the RFRP signal 82 of FIG. 2c is a selectable slice level (or mirror threshold) 94 about which the sinusoidal mirror signal fluctuates. The slice level 94 is implemented to determine track transition through mirror signal transition through the slice level 94. More particularly, as can be seen in FIG. 1, the RFRP signal 82 is top and bottom held (respectively in top-hold 96 and bottom-hold 98 digital to analog (DACs) converters). By combining the top-hold and bottom-hold threshold levels in, for example, divide-by-2 circuit, an output from the (exemplary) divide-by-2 circuit is applied to an inverting input of mirror comparator (e.g., MIRCMP) circuit 102. Of course, the divide-by-two circuit suggests a logic circuit implementation, although it is equally feasible to use a potential divider network that defines a voltage between $V_{top}$ and $V_{bottom}$. For example, using the potential divider network, the slice level 94 could be $V_{threshold} = V_{bottom} + ((V_{top} - V_{bottom})/2)$. The mirror comparator circuit 102 is arranged to slice (e.g., sample) the RFRP signal 92 that is applied to its non-inverting input to generate the mirror signal 104, as seen in FIG. 2d.

As can be seen in FIG. 2d, level transitions caused by the interrupt44 (region of maximum reflectivity) through the slice level 94 generate a pulse in the mirror signal 104 during on-track operation, with the on-track mode determined by the NHOLD signal 78. A defect, however, does not experience any level transition through the slice level 94 and so does not generate any pulse in the mirror signal 104. Therefore, logical combining (such as in an AND gate 118) of the NHOLD signal 78 with the mirror signal will produce an identifiable interrupt pulse 110 during on-track operation. The interrupt pulse 110 is indicative of an interrupt in the optical media, which interrupt pulse can be used by a controller 120 (such as a microprocessor) to set an interrupt flag and suspend, as desired, selected system functionality 122. Signal processing in the optical device (12 of FIG. 1) is geared to identify the interrupt or interrupt flag and to react accordingly by suspending, for example, certain data recovery and timing functions. In summary, if the system is on-track, the mirror pulses are not expected. Consequently, unexpected detection of mirror pulses is entirely indicative of the presence of highly reflective interrupt regions.

Regarding the second path from the low pass filter 50, the filter signal; (SUMDC_INT_FLT) 52 is both top held in defect top hold DAC 130 and applied directly to a defect comparator (DftCmp) 132 arranged to provide a defect pulse 134. As a second input, the defect comparator 132 receives a defect threshold signal 136. The defect threshold signal 136 is derived from a held output 138 from the top hold DAC 130 and the rebiased dark level (VREFL) reference signal 30, with the defect threshold signal 136 and the VREFL signal 30 applied to a weighted averaging circuit 140 designed to provide a suitable cut-off (reference 144 of FIG. 2b) to differentiate defects from the mirror signal 104. In contrast with the RFRP signal 82, no inversion of the filtered signal occurs; (SUMDC_INT_FLT) 52, thereby ensuring that a positive and detectable level transition associated with a dark level defect is detectable. Of course, the reason for using the top-hold DAC 130 is simply to provide a relative reference, and so a bottom-hold DAC should be substituted. The operation of the weighted averaging circuit 140 may need to be modified to ensure that the defect threshold signal 136 is set to an appropriate level. The weighted average circuit 140 again suggests a digital implementation, although the circuit 140 can be readily (and preferably) substituted by a potential divider network arranged to provide the threshold level 144. Certain signal processing aspects of the data recovery and mirror recovery mechanisms may be implemented in the form of computer program code.

Figure 3:
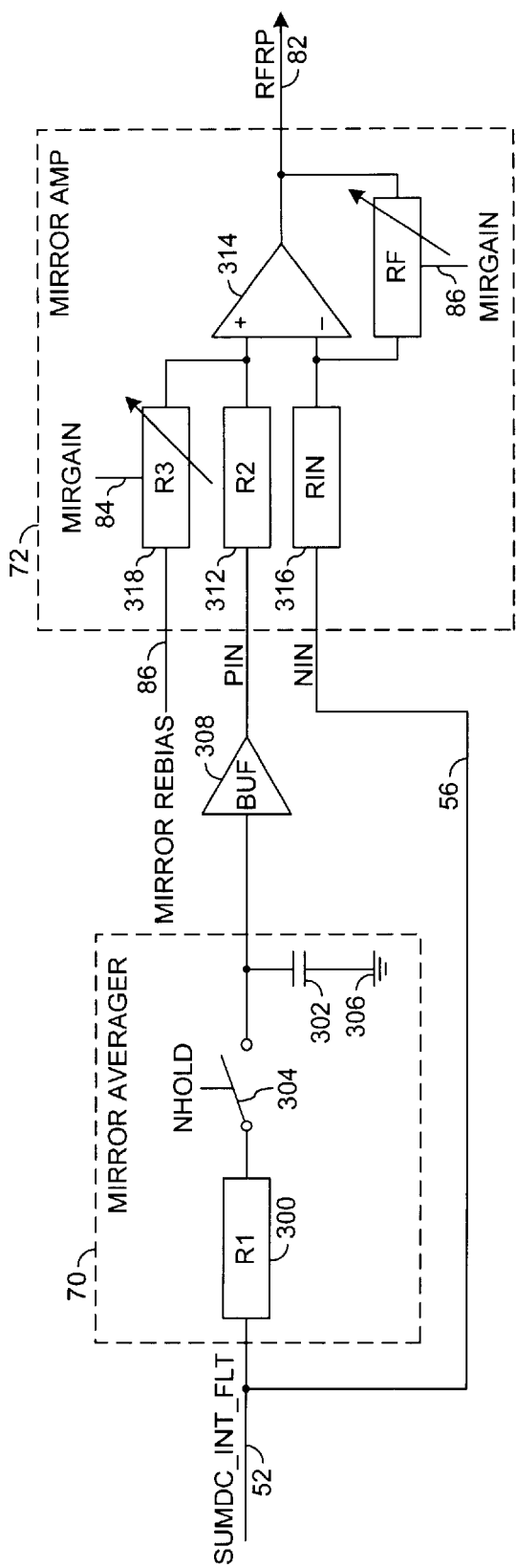
FIG. 3 is a schematic block diagram of a preferred architecture of a mirror averager and mirror amplifier used in the mirror detection circuit of FIG. 1.

Turning to FIG. 3, a schematic block diagram of a preferred architecture of a mirror averager 70 and mirror amplifier 72 for use in the mirror detection circuit 10 of FIG. 1 is shown. The mirror averaging circuit 70 contains a low pass filter comprising a first resistor 300 and a ground-referred capacitor 302. More specifically, the first resistor 300 is coupled to receive the filtered signal SUMDC_NT_FLT 52. The mirror averaging circuit further includes a switch 304, typically of CMOS construction, coupled through a first end of the ground-referred capacitor 302 to ground potential 306. The switch 304 is responsive to an operational state of the optical disc device. In a preferred embodiment, the switch 304 is processor-controlled and is closed during on-track operation and open (to hold the on-track DC level) when track seek or track jump operational modes are active. The ground-referred capacitor 302 supports a high capacitance and hence a large time constant. From a practical perspective, the ground-referred capacitor 302 is implemented off-chip. The ground-referred capacitor 302 may have a finite discharge.

Intermediate between the mirror averaging circuit 70 and the mirror amplifier is a buffer 308. The buffer 308 is coupled to the first end of the ground-referred capacitor 302 and the first resistor 300 through the switch 304. An output from the buffer 308 is the DC level of the read frequency envelope (termed $p_{in}$). Signal pin is applied to the mirror amplifier and more specifically to second resistor ($R_2$) 312. The second resistor $R_2$ is coupled to the non-inverting input of an operational amplifier314, whose non-inverting input is coupled to an input resistor ($R_{in}$) 316 responsive to the mirror modulation signal 52 (termed $n_{in}$) produced from the SUMDC_INT_FLT signal 52. The buffer 308 may ensure that the ground-referred capacitor 302 does not discharge through the second resistor when the switch 304 is open.

The mirror amplifier circuit 72 further includes a first variable resistor ($R_3$) 318 to provides gain adjustment (MIRGAIN) for the mirror amplifier72; the first variable resistor 318 receives the mirror rebias signal 86 as an input. The first variable resistor is coupled in parallel with the second R2 resistor 312.

An output from the operational amplifier 314 provides the RFRP signal 82, which signal is also fed back through a feedback path (containing a second variable resistor (termed $R_f$) 320) to the inverting input of the operational amplifier 314. The second variable gain resistor also provides gain adjustment (MIRGAIN) for the mirror amplifier 72. As will be appreciated, the circuit of FIG. 3 essentially provides a high subtraction of a low passed signal from itself to provide a high passed version of the original signal.

When active, the mirror averaging circuit 70 finds the average level of the SUMDC_INT_FLT signal. If most of the residual read frequency is removed from SUMDC_INT_FLT by the low pass filter 50 of FIG. 1, then during on-track operation the inputs to the mirror amplifier 72 (e.g., $p_{in}$ and $n_{in}$) are essentially equal and the output (RFRP signal 82) of the operational amplifier 72 is set at the mirror rebias level.

As will be appreciated, the gain, $A_v$, of the operational amplifier is given by:

$$A_v = \frac{-R_f}{R_{in}}$$

In order for the output of the operational amplifier 314 to sit at the mirror rebias level 86, then the relationship between the resistors $R_3$ and $R_2$ must be the same as the relationship between $R_{in}$ and $R_f$. The change of gain of the operational amplifier allows maximum (e.g., optimum) variation in the swing of the mirror component of the RFRP signal, with the change in gain providing an improved ability to resolve level transitions using the slicing threshold.

During a seek or jump operation, the mirror averaged level (e.g., the DC level of the read frequency envelope) can be held by the processor (utilizing the NHOLD signal) such that mirror modulation is seen as a swing below the set mirror rebias level at the output of the mirror amplifier 72. The holding of the DC level by the ground-referred capacitor 302 during seek operation, $n_{in}$ varies with the mirror modulation (where $p_{in}$ does not vary). Such a configuration enables the top level of the RFRP signal to be defined by the mirror rebias level and the mirror component swing (during seek operation) to be optimized and always to occur below the mirror rebias level. Being able to define the mirror rebias level and to vary the gain of the mirror amplifier allows the RFRP swing (arising from the mirror modulation) to be optimally positioned for the subsequent Top and Bottom hold circuits (for mirror signal generation) and for the servo DAC range.

In another embodiment of the present invention, the (effectively analog) mirror averaging circuit of FIG. 3 can be substituted for a digital averaging circuit. The digital averaging circuit will typically comprise a comparator, an accumulator and a DAC-based scheme. Equal charge and discharge rates, defined by a master clock, produce a similar result (in the digital averaging circuit) to the RC Low pass filter employed in FIG. 3. The digital averaging circuit may be based on well-known mixed signal processing techniques. The digital circuit DAC approach has the advantage of being able to provide infinite hold when the optical device is in seek or jump modes. Additionally, no droop associated resistance with the switch 304 being open occurs, as may be experienced with the analog scheme of FIG. 3. Furthermore, the digital implementation also requires no external ground-referred capacitor.

It will be appreciated that the above description has been given by way of example only and that modifications in detail may be made within the scope of the present invention. For example, the principal of implementing a ground referred capacitor in contrast with an AC coupling scheme for mirror recovery can be implemented in isolation and does not require the explicitly recited circuitry of FIG. 1. The mirror averaging circuit and the mirror amplifier could be provided in either a discrete component format or most likely on an integrated circuit, although the capacitor for DC level storage would generally be implemented off-chip in view of its capacitive size. While the present invention is particularly applicable to optical disc players, the concepts can be applied to multi-format optical disc environments, such as DVD multi-architectures and the like. It is further contemplated that signal processing and manipulation could be implemented in a digital, processor-based domain requiring use of computer program code modules. However, it is most likely that the present invention will be performed by a combination of hardware and software.

What is claimed is:

1. A mirror circuit for an optical disc media device, the mirror circuit comprising:

an amplifier comprising a first input arranged to receive an averaged DC level of a read frequency envelope derived from modulated data on said optical disc, said amplifier configured to receive a biasing signal having a rebias level, a component signal having a mirror modulation component and a data component substantially corresponding to the averaged DC level and provide an amplified output signal, wherein said output signal is controlled by a feedback path of said component signal and the biasing signal is configured to cause a level swing induced by a mirror modulation component in the amplified output signal to be below said rebias level, allowing the rebias level to appear as the amplified output signal when the data component is present at the second input.

2. The mirror circuit of claim 1, wherein said amplifier comprises:

a first potential divider network comprising a first input configured to receive said biasing signal; and a second potential divider network comprising a second input configured to receive said component signal.

3. The mirror circuit of claim 2, wherein said first potential divider network and said second potential divider network match.

4. The mirror circuit of claim 2, wherein:

the first potential divider network includes a first resistor coupled to the first input and a first variable resistor coupled to the first input and further coupled in parallel with the first resistor, the first variable resistor arranged to receive the biasing signal; and the second potential divider network includes a second resistor coupled to the second input and a second variable resistor within the feedback path and coupled to the second input.

5. The mirror circuit of claim 1, further comprising:

an averaging circuit comprising an in-line resistor coupled to receive the amplified output signal and a ground-referred capacitor coupled to ground between the in-line resistor and the biasing signal.

6. The mirror circuit of claim 5, further comprising:

a switch coupled between the resistor and the ground-referred capacitor.

7. The mirror circuit of claim 5, further comprising:

a buffer coupled between the averaging circuit and the biasing signal.

8. The mirror circuit of claim 1, further comprising:

a digital averaging circuit coupled to receive the component signal and arranged to provide the averaged DC level to the biasing signal.

9. A method of biasing an extracted mirror component from an optical disc, the extracted mirror component used for slicing to generate a mirror signal, comprising the steps of:

(A) applying an averaged DC level of a read frequency envelope derived from modulated data on the optical disc;

(B) applying a component signal having a mirror modulation component and a data component substantially corresponding to the averaged DC level; and (C) applying a biasing signal having a rebias level to step (A), the biasing signal causing a level swing induced by the mirror modulation component in an amplified output signal to be below the rebias level and to cause the rebias level to appear as the amplified output signal when the data component is present in the component signal.

10. The method according to claim 9, further comprising the step of:

generating the averaged DC level either by (i) holding the DC component of the signal on a ground-referred capacitor electrically isolated from the first input or (ii) generating a digital voltage representation of the averaged DC level.

11. The method according to claim 9, wherein:

step (A) further comprises applying the averaged DC level to the biasing signal through a first potential divider network; and step (B) provides a feedback path for the amplified output signal, the feedback path forming part of a second potential divider network that is matched to the first potential divider network.

12. A computer readable medium configured to execute the steps of claim 9.

13. A method of biasing an extracted mirror component from an optical disc supporting data in a signal envelope, the extracted mirror component derivable from mirror modulation of the signal envelope, comprising the steps of:

(A) filtering the signal envelope to generate, over time, a first signal having:
  (i) a DC offset component representative of the data; and
  (ii) a mirror modulation providing variations in level from the DC offset component; and (B) re-biasing the first signal to produce an intermediate signal in which level swings attributable to the mirror modulation are below a reference level associated with the DC offset component.

14. The method of claim 13, further comprising the step of:

(C) slicing the intermediate signal to generate pulses of a mirror signal.

15. The method of claim 13, wherein step (B) further comprises sub-step of:

(B-1) applying a biasing signal having a rebias level to a non-inverting input of a differential amplifier, the biasing signal causing the level swings in an amplified output signal to be below the rebias level and further causing the rebias level to appear as the amplified output signal when data is present in the signal applied to an inverting input of the differential amplifier.

16. The method of claim 15, wherein step (B) further comprises sub-step of:

(B-2) generating a high passed version of the first signal as the amplified output signal, the high passed version generated in a feedback path to the inverting input.

17. The method of claim 16, wherein step (B) further comprises sub-step of:

(B-3) maintaining correspondence between a gain in the feedback path and a gain associated with the biasing signal, wherein the feedback path has a variable gain.

* * * * *